United States Patent [19]

Sih

[11] 3,868,306

[45] Feb. 25, 1975

[54] METHOD FOR PREPARING 3(S OR R)-HYDROXY-1-IODO-1-TRANS-OCTENE

[75] Inventor: Charles J. Sih, Madison, Wis.

[73] Assignee: Wisconsin Alumni Research Foundation, Madison, Wis.

[22] Filed: Nov. 12, 1973

[21] Appl. No.: 411,773

[52] U.S. Cl.................................. 195/51 R, 195/30
[51] Int. Cl............................................ C12d 1/00
[58] Field of Search................... 195/28 R, 30, 51 R

[56] References Cited
UNITED STATES PATENTS 3,687,811   8/1972   Colton et al........................... 195/30
3,799,841   3/1974   Marsheck et al..................... 195/30

Primary Examiner—Lionel M. Shapiro
Assistant Examiner—R. B. Penland
Attorney, Agent, or Firm—Howard W. Bremer

[57] ABSTRACT

Method for preparing 3(S or R)-hydroxy-1-iodo-1-trans-octene to the fermentative action of a microorganism of the classes Ascomycetes, Phycomycetes and Fungi Imperfecti. The compounds are key intermediates in the preparation of prostaglandins of the $E_2$, $F_2$, $A_2$ and $B_2$ series.

4 Claims, No Drawings

METHOD FOR PREPARING 3(S OR R)-HYDROXY-1-IODO-1-TRANS-OCTENE

The Government has rights in this invention pursuant to Contract No. AID/csd-2965 awarded by the Agency for International Development This invention relates to a method for preparing certain compounds which are important intermediates in the preparation of prostaglandins.

More particularly, this invention relates to a compound which is a key intermediate in the preparation of prostaglandins of the $E_2$, $F_2$, $A_2$ and $B_2$ series.

Still more specifically, this invention relates to a process for preparing 3-hydroxy-1-iodo-1-trans-octene in its optically active forms.

The Government has rights in this invention pursuant to Contract No. AID/csd 2965 awarded by the Agency for International Development.

The prostaglandins, a family of $C_{20}$ carboxylic acids, are of great interest because of the broad spectrum of physiologic responses which they elicit in animals, including man, even in nanomolar concentrations. Prostaglandin $E_2$ ($PGE_2$) and prostaglandin $F_{2\alpha}$ ($PGF_{2\alpha}$) have commanded particular attention because they have elicited physiologic responses closely tied with reproduction. It has been observed, for example, that an intravenous injection of a very low dose of either $PGE_2$ or $PGF_{2\alpha}$ stimulates contraction of the uterus and that prostaglandins are present in amniotic fluid and in the venous blood of women during the contractions of labor. This suggests that the prostaglandins may play an important role in parturition. Other observations of the activity of prostaglandins, and particularly $PGF_{2\alpha}$ in the reproductive cycle in animals indicates that that prostaglandin and perhaps others may become important population controlling agents.

In general, the development of prostaglandins has been limited because of the shortage of these materials and consequently their high cost. The sucess of the $E_2$ and $F_{2\alpha}$ type of prostaglandins as family planning aids will depend not only on their specific activities but also on their availability - and it is anticipated that there will be a massive need for such compounds.

It is the primary purpose of this invention to provide a process for producing optically active compounds which find application as a key intermediate in the production of prostaglandins and particularly in the production of natural prostaglandins of the $E_2$, $F_2$, $A_2$ and $B_2$ series.

In the production of $PGE_1$ C. J. Sih et al., have suggested a synthesis which is completely stereospecific (See J. Amer. Chem. Soc., 95, 1676 (1973) by C. J. Sih et al). In that publication it was pointed out that control of the stereochemistry during the procedure was essential to obtaining the desired products. C. J. Sih also reports (Tetrahedron Letters, No 25, pp. 2,313–2316, Pergamon Press (1973) that in the synthesis of prostaglandin $E_2$, and analogous to the preparation of the $PGE_1$ series, the asymmetric centers at the 8, 11 and 12 positions in the $PGE_2$ molecule are controlled by the configuration of the alkoxy function at $C_4$ in the intermediate 2-(6-carbomethoxy-cis-2-hexenyl)-4(R)-(2-tetrahydropyranyloxy) -2-cyclopenten-1-one. The disclosure of the latter reference is to be considered incorporated in this application by reference.

It has now been found that chirality at C-15 in the $PGE_2$ molecule can be introduced asymmetically via microbial reduction of 1-iodo-1-octen-3-one. The resulting stereospecific iodo alcohol is then converted to the ethoxyethyl ether

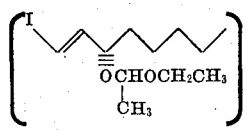

which is treated with two moles equivalents of tert-butyllithium to generate the vinyllithium reagent and tri-n-butylphosphine-copper iodide complex gave the following cuprate.

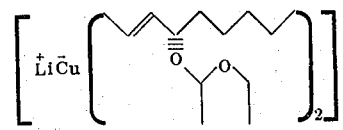

The cuprate was in turn reacted with 2-(6-carbomethoxy-cis-2-hexenyl)-4 (R)-(2-tetrahydropyranyloxy)-2-cyclopenten-1-one, the resulting product was subjected to acidic hydrolysis to give $PGE_2$ methyl ester

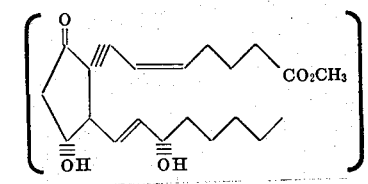

which was converted to $PGE_2$ by exposure to Rhizopus oryzae.

Broadly, the invention relates to a process for preparing 3(S or R)-hydroxy-1-iodo-1-trans-octene by subjecting 3-oxo-1-iodo-1-trans-octene to the fermentative enzymatic action of microorganisms of the classes Ascomycetes, Phycomycetes and Fungi Imperfecti.

It has been observed that there are variations in the efficiency with which various of the microorganisms in the forgoing classes accomplish the process of reduction of this invention. The relative efficiency of a given organism to accomplish the reduction can be readily ascertained from the screening procedure outlined below.

General Screening Procedure to Determine Efficiency of any Specific Organism

Inoculate the microorganism onto Sabouraud's agar slants or other agar base media suitable for growth. Place the inoculated slants in an incubator maintained at 25°C. and allow to grow for 1 week. Remove the slant and add 15 ml. of sterile distilled water to it. Loosen the spores and vegetative growth from the agar with a sterile needle. Transfer the suspension to a flask containing 50 ml. of the soy-dextrose medium described below and place the flask in a rotary shaker in an incubator maintained at 25°C. at 210r.p.m. for 24 hours. After this initial time period (first stage seed), add 5 ml. of the submerged growth to each of duplicate flasks of three types of media, namely, soy-dextrose, cerelose Edamine and dextrin-cornsteep, the compositions of which are given below. Place the flasks in the shaker and allow to grow from about 24 to 48 hours at 25°C. The cells were then harvested by centrifugation.

Incubation

The harvested cells were suspended in 50 ml. of 0.033M borate buffer, pH 8.5 in a 250 ml Erlenmeyer flask. To this was added 25 mg of 3-oxo-1-iodo-1-trans-octene in 1 ml of acetone. Incubation was carried out at 25° C on a rotary shaker at 290 r.p.m. (1 inch stroke) for 19 hours.

Extraction

After 19 hours, the cells were removed by centrifugation and the supernatant solution was extracted with 25 ml portion of chloroform three times. The chloroform layer was dried over sodium sulfate and evaporated to dryness. The residue was dissolved in a few drops of acetone and analyzed via thin layer chromatography using silica gel G plates. A suitable system being chloroform. After development, the plates are sprayed with 3% ceric sulfate in $3NH_2SO_4$ to reveal the compounds as brown spots. The following Rf values were observed for the compounds of interest.

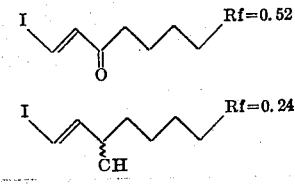

Constitution of illustrative nutrient media suitable for the above screening procedure and for the batch fermentations given below in the examples are as follows:

Soy-dextrose

| | |
|---|---|
| Soybean meat | 5 g. |
| Dextrose | 20 g. |
| NaCl | 5 g. |
| $K_2HPO_4$ | 5 g. |
| Yeast | 5 g. |
| Water | 1 l. |
| pH adjusted to 7.0 | |
| Autoclave at 15 psi for 15 minutes | |

Cerelose-Edamine

| | |
|---|---|
| Cerelose (crude dextrose) | 50 g. |
| Edamine* | 20 g. |
| Cornsteep liquor | 5 ml. |
| Water | 1 L. |
| pH adjusted to 7.0 | |

*An enzymatic hydrolysate of milk protein obtainable from Sheffield Farms Co.

Dextrin-Cornsteep

| | |
|---|---|
| Dextrin | 10 g. |
| Cornsteep liquor | 80 g. |
| $KH_2PO_4$ | 1 g. |
| NaCl | 5 g. |
| Water | 1 l. |
| pH adjusted to 7.0 | |
| Autoclave at 15 psi for 30 minutes | |

The above general screening procedure and nutrient media, as well as the fermentations in the Examples below are illustrative only and can be varied in different ways. Thus, other microorganisms which effect the redution process of this invention than those specifically recited can be used; sources of nitrogen and carbon in the nutrient media other than those specified above may also be employed. (For example, corn mean, oat meal, meat extract or other protein hydrolysates can be used or sucrose, glucose, maltose, starch, molasses, etc., can be substituted for the dextrin.) Also, other modifications familiar in the fermentation art may be employed — the time of addition of the substrate after addition of the medium can be varied; the initial pH for addition and conversion of the substrate can be varied from about 5.0 to about 7.5; the quantity of substrate and the stirring rate can be varied.

Products produced in accordance with the following Examples were identified as to structure through the use of ultraviolet, infrared, and nuclear magnetic resonance spectra, and by thin-layer chromatographic mobilities.

Example 1

Reduction by p. decumbens

Cells were harvested from 2 liters of culture broth (5 × 400 ml) in 2 liter Erlenmeyer flasks) and were suspended in 2 liters of .025 M boric acid-borax buffer solution. The cell suspension was divided into four equal portions each of which was placed in a 2 liter Erlenmeyer flask. One gram of 3-oxo-1-iodo-1-trans-octene was dissolved in 40 ml of acetone and the resulting solution was divided equally into the four flasks. The cell suspension was shaken at 290 r.p.m. for 19 hours. The cells were removed by centrifugation (16,000 g, 15 min.), the supernatant was extracted 3 times with 3 liters of chloroform. The removed cells were resuspended in four flasks (those which were used for reduction) by adding 250 ml of distilled water to each flask, after which the flasks were shaken vigorously on a rotary shaker and the emulsion formed by shaking was separated by centrifugation. After removing the chloroform and any ethyl acetate present, both residues were combined and applied to a 2 × 21 cm alumina chromatographic column. The column was eluted with a gradient system consisting of 300 ml of 10% ethylacetate-benzene followed by 300 ml of 30% ethylacetate-benzene and 4.0 ml fractions were collected. Fractions 42 to 102 were collected as the reduction product and yielded 104 mg. of the desired 3(S) enantiomer.

$([\alpha]_D^{27°}: +7.5$ (C, 3.69 in MeOH))

Example 2

Reduction by p. Vinaceum

The reduction procedure was same as Example 1 except that:

a. the cells were harvested from 2 liters of culture broth (4 × 500 ml in 2 liter flasks) and were suspended in 2 liters of .033M boric acid-borax buffer;

b. the emulsion formed by shaking was broken by passing through a celite pad on a Buchuer funnel;

c. the column size was 2 × 20 cm and 5.2 ml fractions were collected. Fractions 27 – 70 were collected as the reduction product and yielded 100 mg of the desired 3(S) enantiomer.

$([\alpha]_D^{27°} = +7.56$ (C, 5.86 in MeOH))

EXAMPLE 3

Reduction by A. Ustus

Reduction procedure was the same as Example 2 except that 6.5 ml fractions were collected. Fraction 16 - 36 were collected as the reduction product and yielded 120 mg of the desired 3(R) enantiomer.

$([\alpha]_D^{27°} = -8.04$ (C, 5.97 MeOH))

In the following Examples no indication is given as to whether the 3(S) or 3(R) enantiomer is obtained as the reduction product. The optical form of the product can be readily established by optical rotation procedures as is well known in the art. Also, in the following Examples, where no microorganism class is indicated the microorganism specified is of the class Ascomycetes.

EXAMPLES 4 through 83

The procedure of Example 1 was repeated with each of the organisms listed in the following Table. The organisms listed are on deposit and may be obtained from Northern Regional Research Laboratory (NRRL) at Peoria, Illinois and the appropriate NRRL identification number is shown for each organism. In all cases reduction to the desired 3(S or R)-hydroxy-1-iodo-1-trans-octene was obtained.

| Example | Organism | |
|---|---|---|
| 5 | Y32 | Endomyces verualis |
| 6 | Y4798 | Geotrichum candidum-Moniliales (F.I.) |
| 7 | Y25 | Endomycopsis fibuli |
| 8 | Y317 | Rhodotorula aurantiaca-Moniliales (F.I.) |
| 9 | Y11 | Candida lipolytica-Moniliales (F.I.) |
| 10 | Y114 | Pichia aleoholophila |
| 11 | Y100 | Oidium lactis-Moniliales (F.I.) |
| 12 | Y320 | Rhodotorula pallida |
| 13 | Y366 | Hansemula saturnus |
| 14 | Y118 | Candida guillermondii |
| 15 | Y87 | Torulopsis pulcherrima-Moniliales (F.I.) |
| 16 | Y1011 | Saccharomyces acidifaciens |
| 17 | Y974 | Saccharomycodes ludwigii |
| 18 | Y1678 | Hansemula silvicola |
| 19 | Y1798 | Hansemula angusta |
| 20 | Y1938 | Endomycopsis chodati |
| 21 | Y750 | Candida curvata |
| 22 | Y2345 | Saccharomyces carlsbergensis |
| 23 | Y12752 | Saccharomyces pastorianus |
| 24 | Y5952 | Pichia membranaefaciens |
| 25 | EMC-3 | Candida utilis |
| 26 | 1752 | Gliocladium vermoeseni |
| 27 | 1587 | Stysanus fimetarius-Moniliales (F.T.) |
| 28 | 1697 | Theilavia sepedonium |
| 29 | 1673 | Dematium pullulans |
| 30 | 1695 | Stachybotrys lobulata-Moniliales (F.I.) |
| 31 | 1669 | Chaetomium globosum Sphaeriales (Ascomycetes) |
| 32 | 1588 | Trichothecium voseum-Moniliales (F.I.) |
| 33 | 4087 | Mucor hiemalis (+) Mucorales (Phycomycetes) |
| 34 | 2286 | Rhijopus arrhizus Mucorales Phycomycetes) |
| 35 | 1860 | Scopulariopsis constantini-Moniliales (F.I.) |
| 36 | 2284 | Fusarium moniliforme-Moniliales (F.I.) |
| 37 | 2208 | Haplographium chlorocephalum-Moniliales (F.I.) |
| 38 | 2238 | Heterocephalum aurantiacum-Moniliales (F.I.) |
| 39 | 1085 | Gliocladium roseum (F.I.) |
| 40 | 1982 | Memnoniella echinata-Moniliales (F.I.) |

-Continued

| Example | Organism | |
|---|---|---|
| 41 | 10045 | Trichoderma viride-Moniliales (F.I.) |
| 42 | 4663 | Stysomus stemonites (F.I.) |
| 43 | 49137 | Cephalosporium sp.-Moniliales (F.I.) |
| 44 | 6737 | Septomyxa offinis Melanconiales (F.I.) |
| 45 | 5358 | Zygorhynchus sp. Mucorales (Phycomycetes) |
| 46 | 5056 | Aspergillus janus-Moniliales (F.I.) |
| 47 | 4326 | Cephalothecium roseum-Moniliales (F.I.) |
| 48 | 874 | Penicillium caseicolum-Moniliales (F.I.) |
| 49 | 79 | Aspergillus chevalieri-Moniliales (F.I.) |
| 50 | 707 | Penicillium javanicum-Moniliales (F.I.) |
| 51 | 888 | Penicillium lanoso-coeruleum-Moniliales (F.I.) |
| 52 | 973 | Penicillium expansum-Moniliales (F.I.) |
| 53 | 447 | Aspergillus oryzae-Moniliales (F.I.) |
| 54 | 849A | Penicillium roqueforti (white mutant) Moniliales (F.I.) |
| 55 | 1074 | Penicillium diversum var. aureum (F.I.) |
| 56 | 877 | Penicillium camemberti (F.I.) |
| 57 | 1839 | Mucor rammannianns Mucorales (Phycomyutes) |
| 58 | 1852 | Aspergillus ustus var. laevis (F.I.) |
| 59 | 2020 | Penicillium duclauxi (F.I.) |
| 60 | 2254 | Aspergillus clavatus (F.I.) |
| 61 | 2077 | Penicillium thomii (F.I.) |
| 62 | 2245 | Penicillium simplicissimum (F.I.) |
| 63 | 2031 | Penicillium claviforme (F.I.) |
| 64 | 2240 | Aspergillus violaceus (F.I.) |
| 65 | 5353 | Aspergillus kanafawaensis (F.I.) |
| 66 | 4103 | Gliocladium roseum-Moniliales (F.I.) |
| 67 | 5356 | Aspergillus janus (F.I.) |
| 68 | 5557 | Penicillium expansum (F.I.) |
| 69 | 5354 | Mucor ramomianius Mucorales (Phycomycetes) |
| 70 | 4896 | Gliocladium catenulatum-Moniliales (F.I.) |
| 71 | 5058 | Alternaria tenuis-Moniliales (F.I.) |
| 72 | Myc. | Mycotypha sp. -Moniliales (F.I.) |
| 73 | 4026 | Penicillium caseicolum (F.I.) |
| 74 | 4084 | Penicillium granilatum (F.I.) |
| 75 | 5180 | Penicillium roqueforti (F.I.) |
| 76 | 684 | Mycotypha microspora (F.I.) |
| 77 | 1085 | Gliocladium roseum (F.I.) |
| 78 | 1118 | Paecilomyces varioti-Moniliales (F.I.) |
| 79 | 1407 | Mucor genevensis Mucorales (Phycomycetes) |
| 80 | 1282 | Paecilomyces varioti = 1118 (F.I.) |
| 81 | 163 | Aspergillus fumigatus (F.I.) |
| 82 | 174 | Aspergillus fumigatus mut. helvola (F.I.) |
| 83 | 181 | Aspergillus fischeri (F.I.) |

It will be obvious that variations in the proportions and amounts of reactants can favorably or unfavorably affect the yield of the desired products and it is to be understood that such proportions and reactant amounts which are specified in the foregoing Examples are not to be considered critical to obtaining the desired products.

Having thus described the invention, what is claimed is:

1. A process for producing 3(S or R)-hydroxy-1-iodo-1-trans-octene which comprises subjecting 3-oxo-1-iodo-1-trans-octene to the fermentative enzymatic action of a microorganism selected from the classes Ascomycetes, Phycomycetes and Fungi Imperfecti.

2. The process of claim 1 wherein the microorganism is *Penicillium decumbens* and the reduction product is 3(S)-hydroxy-1-iodo-1-trans-octene.

3. The process of claim 1 wherein the microorganism is *Penicillium vinaceum* and the reduction product is 3(S)-hydroxy-1-iodo-1-trans-octene.

4. The process of claim 1 wherein the microorganism is *Aspergillus ustus* and the reduction product is 3(R)-hydroxy-1-iodo-1-trans-octene.

* * * * *